Oct. 18, 1949.                E. R. WORKMAN                2,485,229
                              WELDING APPARATUS
                             Filed Oct. 10, 1945
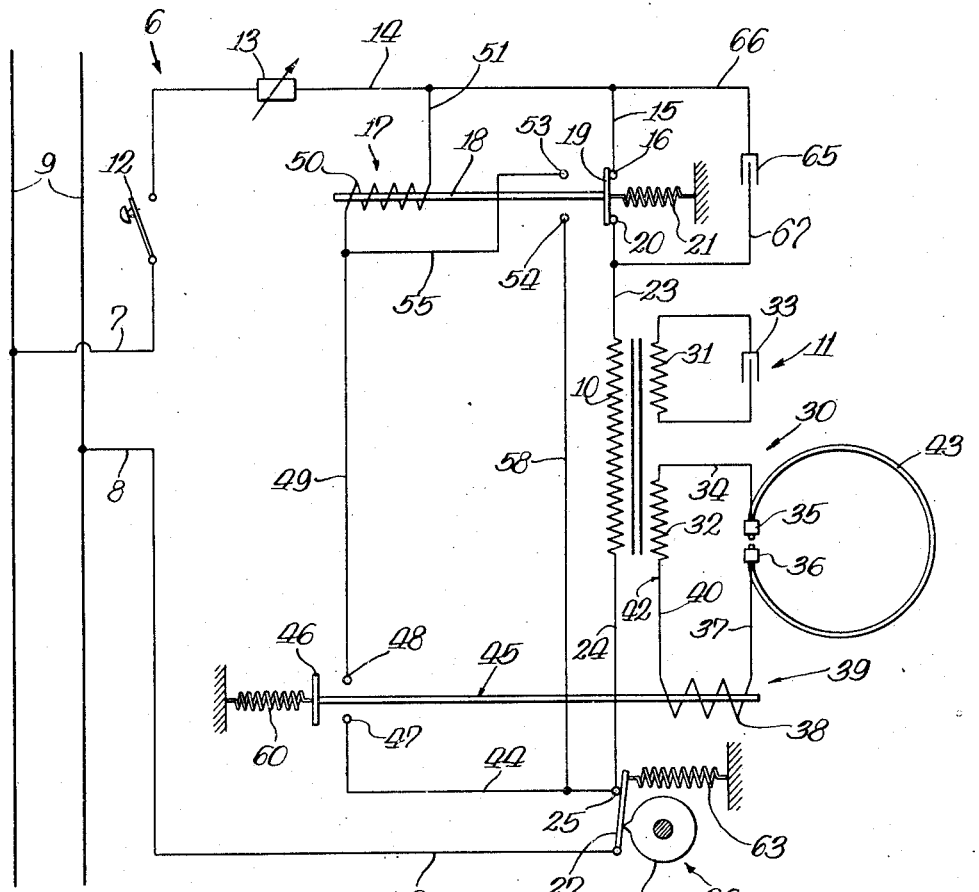
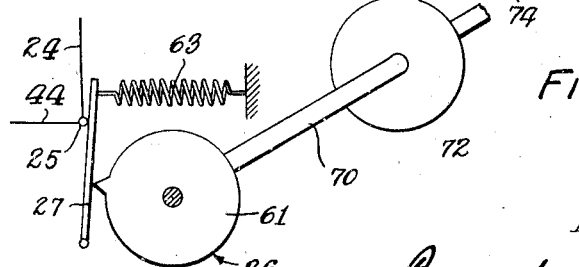
INVENTOR.
Ernest Robert Workman Patented Oct. 18, 1949

2,485,229

UNITED STATES PATENT OFFICE 2,485,229

WELDING APPARATUS

Ernest Robert Workman, Chicago, Ill.

Application October 10, 1945, Serial No. 621,555

10 Claims. (Cl. 219—4)

My present invention relates to an improvement in welding apparatus.

The welding apparatus of my present invention has particular utility for use with automatic banding machines of the type shown, for example, in my Patent No. 2,356,904, dated August 29, 1944, although it will be understood that my instant invention is not limited to such use but has wide application in the general field of welding as for example, with the portable welding device of my Patent No. 2,371,664, dated March 20, 1945. My present invention, however, is particularly advantageous for use with automatic banding machines as aforesaid in which wire is adapted to be withdrawn by suitable mechanism from a supply source to be formed into a banding loop. An object or package to be bound is then positioned in the loop thus formed and the wire loop contracted about the object by reversing the drive of the mechanism for withdrawing the wire from the supply source. Upon contraction of the loop the wire leading from the supply is severed and the two ends of the contracted loop brought together and butt welded to secure the contracted loop about the object. In effecting butt welding of the ends of the contracted loop the banding machine is provided with a pair of jaw members for holding the ends of the contracted loop, which jaw members are shiftable relative to each other to bring the ends of the contracted loop together to effect butt welding of the ends thereof. In this type of machine suitable cam means is generally provided to close a welding circuit for welding the abutting ends of the contracted loop at a predetermined time in the sequence of steps of operations of the mechanism such as upon movement of the jaws holding the ends of the contracted loop toward each other. However, this nicety of timing cannot be effected when as in the case of the use of such banding machines for banding objects with the banding loops or hoops under varying degrees of tension which will be the case in the vast majority of instances in the use of the banding machine. In such instances the fixed setting of the timing sequence for initiating the heating period for the weld with respect to movement of the jaws holding the ends of the banding loop will not result in uniform welds in that in banding objects the contracted loop will be under considerable tension so that upon bringing the ends of the contracted loops together by moving the jaws relative to each other the heating period for the welding of the ends is begun before the ends of the contracted loop are engaged which results in an imperfect weld. Since the tension in a loop about an object will be considerable, these imperfect welds will frequently not hold. Conversely in the production of hoops in the above preset sequence of steps of operation of the machine the abutting ends of the severed band will be brought together by the relatively movable jaws before initiation of the heating period since no tension or strain is involved in production of welded hoops, which results in the abutting ends being placed under considerable pressure by continued movement of the jaws toward each other thus reducing the electrical resistance between the contacted ends of the severed loop below the desired amount so that no weld will be formed, or if a weld is formed it will be imperfect.

Also this scheme of timing the heating period for a weld in the sequence of steps of a banding machine, as above described, in which the relatively movable jaws are movable toward each other frequently results, under certain circumstances, with the metal of the adjacent ends of the contracted loop being heated beyond the immediate ends thereof. When this occurs the metal adjacent the ends of the contracted loop upon release of the jaws holding the adjacent abutting ends of the contracted loop will not have cooled sufficiently to solidify so that upon release of the ends of the contracted loop by the jaws the weld will not hold.

It is an object of my invention therefore to provide a welding apparatus in which the heating period for the weld is adapted to be initiated upon contacting of the two parts to be welded together, together with means for automatically timing the flow of welding current.

A further object of my invention is to provide a welding apparatus, as above set forth which is effective to heat only that portion of the parts to be welded together without heating any portion of such parts therebeyond so that completion of the weld is formed with a minimum cooling period.

In order to accomplish the aforesaid objects I propose to provide a welding transformer which in the usual manner has its primary winding means in circuit with an alternating current supply, and in which the secondary winding means is incorporated in a welding circuit. With the circuit through the primary closed, the arrangement of the welding circuit is such that current flow is established therethrough upon contacting of the parts to be welded together. In order to interrupt the primary circuit upon completion of the weld, I propose to incorporate suitable timing means initiated by closing of the welding circuit to open or interrupt the primary circuit which then effects deenergization of the secondary winding means of the welding transformer in the welding circuit.

A preferred feature of my invention resides in the use of relay means to effect the aforesaid timing of the weld which comprises a first relay, the energizing coil of which is adapted to be energized upon closing of the welding circuit to effect closing of a circuit through the energizing coil of a second relay which in turn opens the primary circuit. Thus upon completion of the welding circuit by the contacting of the abutting ends of a contracted loop, the time required for energizing the coils of the relays and the building up of magnetic fields therein to attract the armatures associated therewith before interruption of the primary circuit is effected is sufficient for welding of the abutting ends of the contracted loop. This timing of the weld may be adjusted by increasing the pressure of the springs which maintain the armatures of the relays in their normal positions, or by the incorporation in the circuit of slow acting relays or a series of one or more relays, or by known electronic tube arrangements.

A further preferred feature of my invention resides in the provision in the welding transformer of a pair of secondary windings, one of which is adapted to effect welding of the two parts together as aforesaid and with the other being arranged to improve the surge effect of the welding circuit immediately upon engagement of the abutting ends of the contracted loop or the bringing together of the parts to be welded. A further preferred feature resides in the provision of relay means for maintaining the primary circuit open after completion of a weld.

Other objects, features and advantages of my invention will appear from the detailed description.

Now, in order to acquaint those skilled in the art with the manner of constructing and utilizing welding apparatus in accordance with my invention, I shall describe in connection with the accompanying drawing a preferred embodiment of my invention.

In the drawing:

Figure 1 is a circuit diagram of a welding apparatus constructed in accordance with my invention illustrating the manner in which such apparatus may be incorporated in an automatic binding machine; and Figure 2 is a diagrammatic view of actuating means for effecting closing of a switch or the welding circuit and for bringing parts to be welded together in a predetermined sequence with respect to closing of the switch.

Referring now to Figure 1 of the drawing, it will be observed that I have provided a primary circuit 6 which comprises a pair of leads 7 and 8 having connection with a source of alternating current such as the power lines 9—9. The primary circuit 6 includes the primary winding means 10 of a welding transformer indicated generally at 11 and it will be seen that the primary winding 10 is arranged in series with the source of current supply 9—9 by means of a manually operable switch 12 arranged in series in the lead 7 between its connection with one of the power lines 9 and a variable resistor 13 from which a lead 14 extends by means of a branch lead 15 to a contact 16 of a first relay means 17, which relay means 17 comprises an armature 18 having a switch blade 19 for bridging the contact 16 with the contact 20. The spring 21 is connected to one end of the armature for normally biasing the switch blade 19 in bridging engagement between the contacts 16 and 20 so that the latter are normally closed to establish a circuit through the primary winding 10 of the welding transformer 11. It will be understood that the relay 17 is shown diagrammatically and may vary widely in form, but the relay in its preferred form comprises a pair of normally closed contacts such as the contacts 16 and 20 above described. A lead 23 extends from the contact 20 to the primary winding 10 of the welding transformer 11 and a lead 24 extends from the other end of the primary winding 10 to a contact 25, and thence through a switch blade 27, of a cam switch means indicated generally at 26, the switch blade 27 of which has connection with the lead 8 for completing the circuit through the primary winding across the pair of power supply lines 9—9. It will thus be observed that with the manual switch 12 and the cam switch 26 in their closed positions, and with the switch blade 19 of the first relay means 17 in the position, shown in the drawing, bridging the contacts 16 and 20, the primary winding 10 of the transformer will be energized.

The secondary winding means 30 of the welding transformer 11 comprises a pair of secondary windings 31 and 32 with the winding 31 having a condenser or other capacitance 33 in series relation therewith for a purpose to be hereinafter noted. The other secondary winding 32 has connection by means of a lead 34 with a jaw member 35 for holding one end of a banding loop 43 or one part to be welded. A second jaw member 36 for holding the other end of banding loop 43 or other part to be welded to the one part held by jaw member 35 has connection by a lead 37 with the energizing coil 38 of a second relay means 39 with the other end of the coil 38 having connection by a lead 40 to the other end of winding 32. The coil 32 together with the relatively movable jaws 35 and 36, the leads 34 and 37, the coil 38 and the lead 40 form a welding circuit 42 which is adapted to be completed upon relative movement of the jaws 35 and 36 toward each other as upon contacting the ends of the banding loop 43, or other parts to be welded together and held by the jaws 35 and 36. It will be understood that in the general application of my invention in the field of welding suitable known welding terminals may be employed in lieu of the jaws 35 and 36. As previously related the present invention has particular utility in an automatic banding machine and it will be observed that when the jaws 35 and 36 are moved relative to each other the circuit through the welding circuit 42 will be completed immediately upon abutting the adjacent ends of the banding loop with each other whereupon the metal at the extreme ends of the banding loop 43 will be heated and caused to be welded when the primary winding 10 of the welding transformer is energized. I have found that by providing a second secondary winding 31 for the secondary winding means of the transformer in series relation with a capacitator 33 such as a plate condenser markedly improves the surge action of the flow of current in the welding circuit 42 of which the other secondary winding forms a part. It will be observed that in the embodiment of my invention herein disclosed the banding loop 43 electrically connects the jaws 35 and 36 but substantial flow of current through the welding is restricted by the substantial resistance of the banding loop 43, but as soon as the abutting ends of the loop are brought together a circuit is closed between the jaws 35 and 36 shunting the circuit through the banding loop and effecting welding of the contacted ends of the loop. It will be understood that for all practical purposes the welding circuit may be considered to be normally open except upon establishment of the circuit by movement of the jaws 35 and 36 relative to each other to engage the ends of the banding loop. In the use of my invention for welding two separate parts the welding circuit will, in fact, be open until the parts are caused to be engaged. Upon flow of welding current in the welding circuit 42 the coil 38 is energized attracting the armature 45 of the second relay means 39 which is effective to cause the switch blade 46 to bridge normally open contacts 47 and 48, in which the contact 47 has connection by a lead 44 with the contact 25 and in which the contact 48 has connection by lead 49 with one end of the energizing coil 50 of the first relay means 17. The other end of the coil 50 of the first relay means 17 is connected by a lead 51 to the lead 14 whereupon a circuit is completed between the terminals 9—9 with the coil 50. Energization of the coil 50 of the first relay means 17 attracts the armature 18 moving switch blade 19 to open the circuit between the contacts 16 and 19 to open the circuit between the contacts 16 and 20, and close a pair of normally open contacts 53 and 54 in which the contact 53 is connected by a lead 55 to the lead 49 extending to one end of the coil 50 of the first relay means 17, and with the contact 54 having connection by a lead 58 with the lead 44 and which through the cam switch means 26 is effective to maintain the coil 50 of the first relay means in circuit with the power supply lines 9—9 to maintain the armature 18 attracted and the switch blade 19 thereof in bridging relation with the normally open contacts 53 and 54 against the force of the spring 21 normally tending to maintain the switch blade 19 in bridging engagement of the contacts 16 and 20. Opening of normally closed contacts 16 and 20 opens the circuit through the primary winding 10 of the transformer terminating the flow of welding current in the welding circuit 42, so that upon deenergization of coil 38 the spring 60 draws the switch blade 46 out of engagement with the normally open contacts 47 and 48. Also after the jaws 35 and 36 have been shifted relative to each other to bring the opposite ends of the banding loop 43 into abutting relation the time required in building up the magnetic fields in the second relay means 39 and the first relay means 17 provide a means for limiting the current consumed in forming the butt weld between the ends of the banding loop 43. It will be observed that the coil 50 of the first relay means 17 is maintained in circuit by reason of the bridging of the normally open contacts 53 and 54 maintaining the primary circuit opened thus limiting the apparatus to but a single weld for each cycle of operation. Upon rotation of the cam 61 in a counter-clockwise direction from the position thereof shown in the drawing, the spring 63 urges the switch blade 27 away from contact 25 opening the circuit through normally open contacts 53 and 54 to effect deenergization of the coil 50 of the first relay means 17 so that the apparatus is now in a condition for a succeeding welding operation. The circuit through the primary of the welding transformer at this stage is open and will not be closed again until the cam 61 has rotated to effect engagement of the switch blade 27 with contact 25. The cam 61 will be timed to effect closing of the cam switch blade 27, assuming that the manual control switch 12 is closed, to effect energization of the primary winding 10 of the welding transformer 11 just prior to the actuation of mechanism for moving the pair of jaws 35 and 36 relative to each other. After a completion of a weld the machine stops, and switch means, not shown, must be actuated to effect another banding operation.

The mechanism for achieving the above mode of operation may vary widely in form and in Figure 2 I have illustrated diagrammatically one form of actuating means suitable for the purpose. As shown in Figure 2 the cam 61 forming part of the actuating means is mounted on a shaft 70 rotatable in a counter-clockwise direction as viewed in the drawing. The shaft 70 carries a second cam 72 which is adapted to engage the jaw member 36 to move it toward the jaw member 35, which may be stationarily mounted providing for the previously referred to relative movement between the jaw members 35 and 36 to abut the opposite ends of the binding loop 43. The arrangement of the cams 61 and 72 on the shaft is such that the cam 61 first causes engagement of switch blade 27 with contact 25 and while that switch is maintained closed followed by cam 72 advancing jaw member 36 toward jaw member 35 to abut the ends of the banding loop 43. A spring 74 may be provided for returning jaw member 36 to its normal position after completion of a welding operation and removal of the welded banding loop.

It will also be observed in Figure 1 of the drawing that I have provided a condenser 65 which is connected in shunt with the contacts 16 and 20 by the leads 66 and 67 to prevent arcing between the contacts 16 and 20 upon the making and breaking of a circuit therethrough by the switch blade 19.

It is to be observed that the welding transformer 11 is only in service for a short time in each cycle of operation of the banding machine so that it need contain about only half of the usual iron laminations. Also the provision of the stabilizing winding 31 including the capacitator 33 improves the surge of welding current to effect heating of the metal of the weld to a point of fusion in a much shorter period of time than previously accomplished, and since initiation of the heating period is brought about by contacting the end surfaces of the band against one another the usual arcing that destroys initiating switches is eliminated. The termination of the heat period of the welding time takes place at an instant in each cycle of operation when little or no current exists in the primary winding 10 of the welding transformer so that the contacts 16 and 20 of the relay 17 are not destroyed by high current flow when opened.

While I have shown my present invention as associated with a source of alternating current supply 9—9, it will be understood that in the usual automatic banding machine a main or power transformer supply for effecting actuation of other mechanism thereof is provided and that in the application of my invention to such a banding machine the leads 7 and 8 would preferably have connection with the secondary of the power transformer. It is believed that the incorporation of the present welding apparatus in a banding machine, in view of the disclosure herein, is within the knowledge of one skilled in the art and need not be described in further detail.

While I have shown and described what I consider to be a preferred embodiment of my invention, it will be understood that various modifications and rearrangements may be made therein without departing from the spirit and scope of my invention.

I claim:

1. Welding apparatus comprising a welding transformer having primary and secondary winding means, primary circuit means including the primary winding means of said transformer, a first relay means including timing means and comprising an energizing coil and two pairs of contacts with one of said pairs of contacts being normally closed and in circuit with said primary circuit means, and the other of said pair of contacts being normally open and associated with the energizing coil means of said first relay means and a source of current supply, normally open welding circuit means including the secondary winding means of said transformer adapted to be closed upon engagement of parts to be welded, second relay means including timing means associated with said welding circuit comprising normally open contacts in circuit with the coil of said first relay means and said source of current supply adapted upon closing of said welding circuit to close the normally open contacts of said second relay with a delay action, means whereby the coil of said first relay means is energized to open with a second delay action the normally closed contacts thereof and interrupt said primary circuit means, and close the normally open contacts of said first relay means to maintain said primary circuit means open, and cam switch means in circuit with the normally open contacts and coil means of said first relay means to open the circuit through said last named coil means to effect closing of the normally closed contacts of said first relay means.

2. Welding apparatus comprising a welding transformer having primary and second winding means, primary circuit means including said primary winding means, a first relay means including timing means and comprising an energizing coil and two pairs of contacts with one of said pairs of contacts being normally maintained closed and in circuit with said primary circuit means and the other of said pair of contacts being normally open and associated with the energizing coil means of said first relay means and a source of current supply, normally open welding circuit means including the secondary winding means of said transformer and a pair of relatively movable jaw members for holding parts to be welded, said welding circuit being adapted to be completed upon bringing together of the parts to be welded, second relay means including timing means associated with said welding circuit comprising normally open contacts in circuit with the coil means of said first relay means and said source of current supply adapted upon closing of said welding circuit to close the normally open contacts of said second relay means after a predetermined time delay whereby the coil of said first relay means is energized to open after a second predetermined time delay the normally closed contacts thereof and interrupt said primary circuit means and close the normally open contacts of said first relay means to maintain said primary circuit means open, and cam switch means in circuit with the normally open contacts and coil means of said first relay means to open the circuit through said last named coil means to effect closing of the normally closed contacts of said first relay means.

3. Welding apparatus comprising a welding transformer having primary and secondary winding means, primary circuit means including the primary winding means of said transformer, a first relay means including timing means and comprising an energizing coil and two pairs of contacts with one of said pairs of contacts being normally maintained closed and in circuit with said primary circuit means, and the other of said pairs of contacts normally open to normally maintain a circuit through said energizing coil and a source of current supply open, said secondary winding means comprising a pair of secondary windings, normally open welding circuit means including one of said secondary windings of said secondary coil means adapted to be closed upon engagement of parts to be welded, the other of said secondary windings of said secondary winding means having means for increasing the initial current surge through said welding circuit means upon closing of the latter, second relay means associated with said welding circuit comprising normally open contacts in circuit with the coil of said first relay means and said source of current supply adapted upon closing of said welding circuit to close after a predetermined time delay the normally open contacts of said second relay means whereby the coil of said first relay means is energized to open after a second predetermined time delay the normally closed contacts thereof and interrupt said primary circuit means and close the normally open contacts of said first relay means to maintain said primary circuit means open, and cam switch means in circuit with the normally open contacts and coil means of said first relay means for opening the circuit through said last named coil means to effect closing of the normally closed contacts of said first relay means.

4. Welding apparatus comprising a welding transformer having primary and secondary winding means, a normally open primary circuit including said primary winding means, normally closed contact means in said primary circuit, a switch in said primary circuit for closing the same, a normally open welding circuit including said secondary winding means, means in said welding circuit for holding parts to be welded and operable to engage said parts to close said welding circuit, means associated with said switch and said last named means for actuating the same in sequence in the order named so that following closing of said primary circuit said welding circuit is closed, whereby the energized primary winding means is adapted to effect an initial current surge through said welding circuit upon closing of the latter, and current responsive means including timing means for opening said normally closed contact means, said current responsive means being associated with said welding circuit and operable by current flow in the latter.

5. Welding apparatus comprising a welding transformer having primary and secondary winding means, a normally open primary circuit including said primary winding means, normally closed contact means in said primary circuit, a switch in said primary circuit for closing the same, a normally open welding circuit including said secondary winding means, means in said welding circuit for holding parts to be welded and operable to engage said parts to close said welding circuit, means associated with said switch and said last named means for actuating the same in sequence in the order named, so that following closing of said primary circuit said welding circuit is closed, whereby the energized primary winding means is adapted to effect an initial current surge through said welding circuit upon closing of the latter, electromagnetic means including timing means for opening said normally closed contact means, said electromagnetic means being associated with said welding circuit and being operable by current flow in said welding circuit, and means associated with said welding circuit for increasing the initial current surge in said welding circuit upon closing of the latter.

6. Welding apparatus comprising a welding transformer having primary and secondary winding means, a normally open primary circuit including said primary winding means, a first relay including timing means and having normally closed contacts in said primary circuit, said normally closed contacts being adapted to be opened upon energization of said first relay, a switch for closing said primary circuit, a normal open welding circuit including said secondary winding means, means in said welding circuit for holding parts to be welded operable to engage said parts to close said welding circuit, means associated with said switch and said last named means for actuating the same in sequence in the order named, whereby the energized primary winding means is adapted to effect an initial current surge through said welding circuit upon closing of the latter, second relay means including timing means and having normally open contacts adapted to be closed upon energization thereof, said normally open contacts being in circuit with said first relay means and said switch, and said second relay means being associated with said welding circuit for energization by current flow in the latter.

7. Welding apparatus comprising a welding transformer having primary and secondary winding means, a normally open primary circuit including said primary winding means, a switch for closing said primary circuit, a first relay including timing means, an energizing coil, and two pairs of contacts with one of said pairs of contacts being normally maintained closed in said primary circuit, and the other of said pairs of contacts being normally open in circuit with said energizing coil and said switch, said normally closed contacts being caused to be opened and said normally open contacts being caused to be closed upon energization of said first relay, a normally open welding circuit including said secondary winding means, means in said welding circuit for holding parts to be welded and operable to engage said parts to close said welding circuit, actuating means associated with said switch and said last named means for actuating the same in sequence in the order named so that following closing of said primary circuit said welding circuit is closed, whereby the energized primary winding means effects an initial current surge through said welding circuit upon closing of the latter, a second relay including timing means and having normally open contacts in circuit with said energizing coil of said first relay, said normally open contacts of said second relay means being caused to be closed upon energization of said second relay, said second relay means being associated with said welding circuit for energization by current flow through the latter, and said actuating means including means for opening said switch after energization of said first and second relay means.

8. Welding apparatus comprising a welding transformer having primary and secondary winding means, a primary circuit including said primary winding means adapted to have connection with a source of current for energizing the same, a welding circuit including said secondary winding means, means in said welding circuit for holding the ends of a metal hoop spaced apart and with the hoop in series relation in said welding circuit, said means being operable to engage the ends of the hoop to close a circuit through the same in shunt of said secondary winding means and thereby create an initial current surge through the engaged ends of the hoop to weld the same together, and current responsive timing means between said primary circuit and said secondary circuit including contact means in said primary circuit operable by the initial current surge through said welding circuit when the hoop is in shunt thereof for actuating said contact means to open said primary circuit with a time delay, said timing means being characterized by being non-responsive to current flow in said welding circuit when the hoop is in series relation in said welding circuit.

9. Welding apparatus comprising a welding transformer having primary and secondary winding means, a primary circuit including said primary winding means adapted to have connection with a source of current for energizing the same, a welding circuit including said secondary winding means, means in said welding circuit for holding the ends of a metal hoop spaced apart and with the hoop in series relation in said welding circuit, said means being operable to engage the ends of the hoop to close a circuit through the same in shunt of said secondary winding means and thereby create an initial current surge through said transformer and the engaged ends of the hoop to weld the same together, and current responsive timing means including normally closed contacts in said primary circuit operable by the initial current surge created in said transformer by actuation of said means to shunt said welding circuit by engaging the ends of the hoop to open said contacts and open said primary circuit with a time delay, said timing means being characterized by being non-responsive to current flow of lesser amount than said initial current surge through said transformer.

10. Welding apparatus comprising a welding transformer having primary and secondary winding means, a primary circuit including said primary winding means adapted to have connection with a source of current for energizing the same, a welding circuit including said secondary winding means, means in said welding circuit for holding the ends of a metal hoop spaced apart and with the hoop in series relation in said welding circuit, said means being operable to engage the ends of the hoop to close a circuit through the same in shunt of said secondary winding means and thereby create an initial current surge through the engaged ends of the hoop to weld the same together, first relay means including an energizing coil associated with said welding circuit and normally open contacts which are closed upon actuation of said first relay, second relay means including normally closed contacts in said primary circuit and having an energizing coil in circuit with said normally open contacts of said first relay and said primary circuit, said second relay when actuated opening said normally closed contacts thereof, said coil of said first relay being responsive to said initial current surge in said welding circuit to close said normally open contacts closing a circuit through said energizing coil of said second relay and opening said normally closed contacts in said primary circuit, said energizing coil of said first relay being characterized by being non-responsive to current flow in said welding circuit when the hoop is in series relation in said welding circuit, and said first and second relay means including timing means whereby when the coils thereof are energized said primary circuit is opened with a time delay.

ERNEST ROBERT WORKMAN.

REFERENCES CITED

The following references are of record in the file of this patent:

UNITED STATES PATENTS

| Number | Name | Date |
| --- | --- | --- |
| 1,267,481 | Von Henke | May 28, 1918 |
| 1,358,428 | Enger | Nov. 9, 1920 |
| 1,955,520 | Vawter | Apr. 17, 1934 |
| 1,959,690 | Roth | May 22, 1934 |
| 2,183,908 | Gladitz | Dec. 19, 1939 |

FOREIGN PATENTS

| Number | Country | Date |
| --- | --- | --- |
| 544 | Australia | Feb. 12, 1926 |
| 457,257 | Great Britain | Nov. 24, 1936 |
| 427,634 | Great Britain | Apr. 23, 1935 |
| 559,152 | Great Britain | Feb. 7, 1944 |
| 629,564 | France | Aug. 1, 1927 |
| 500,840 | Germany | June 26, 1930 |